United States Patent [19]
Kugue

[11] Patent Number: 5,911,042
[45] Date of Patent: Jun. 8, 1999

[54] COMPUTER SYSTEM HAVING EXPANSION UNIT

[75] Inventor: Jun Kugue, Iruma, Japan

[73] Assignee: Kabushiki Kaisha Toshiba, Kawasaki, Japan

[21] Appl. No.: 08/808,421

[22] Filed: Feb. 28, 1997

[30] Foreign Application Priority Data

Mar. 2, 1996 [JP] Japan .................................. 8-071396

[51] Int. Cl.⁶ .............................. G06F 11/00; H04L 9/00
[52] U.S. Cl. ...................................... 395/188.01; 395/283
[58] Field of Search ............................. 395/188.01, 186, 395/281, 283, 282, 833, 892; 380/3, 4, 23, 25

[56] References Cited

U.S. PATENT DOCUMENTS

| | | | |
|---|---|---|---|
| 4,806,745 | 2/1989 | Oogita | 235/492 |
| 5,282,247 | 1/1994 | McLean et al. | 380/4 |
| 5,375,243 | 12/1994 | Parzych et al. | 395/725 |
| 5,469,564 | 11/1995 | Junya | 395/188.01 |
| 5,537,544 | 7/1996 | Morisawa et al. | 395/188.01 |
| 5,544,083 | 8/1996 | Iizuka et al. | 364/709.01 |
| 5,584,043 | 12/1996 | Burkart | 395/188.01 |
| 5,623,637 | 4/1997 | Jones et al. | 395/188.01 |
| 5,630,057 | 5/1997 | Hait | 395/186 |
| 5,634,075 | 5/1997 | Smith et al. | 395/829 |
| 5,682,475 | 10/1997 | Johnson et al. | 395/188.01 |
| 5,721,837 | 2/1998 | Kikinis et al. | 395/281 |

*Primary Examiner*—Joseph E. Palys
*Attorney, Agent, or Firm*—Finnegan, Henderson, Farabow, Garrett & Dunner, L.L.P.

[57] ABSTRACT

When connection between a computer body and an expansion unit has been detected, a system BIOS detects whether or not a storage device in an access lock state exists in the expansion unit. If a storage device in the access lock state exists, the system BIOS issues APM event to turn on a high-order driver for requiring a user to input a password through the operating system. The system BIOS supplies the input password through the high-order driver to the storage device and returns, to the high-order driver, a result of determination of releasing of the access lock of the storage device. If the result of the determination of releasing is affirmative, assignment of the resource to the storage device is performed.

8 Claims, 7 Drawing Sheets

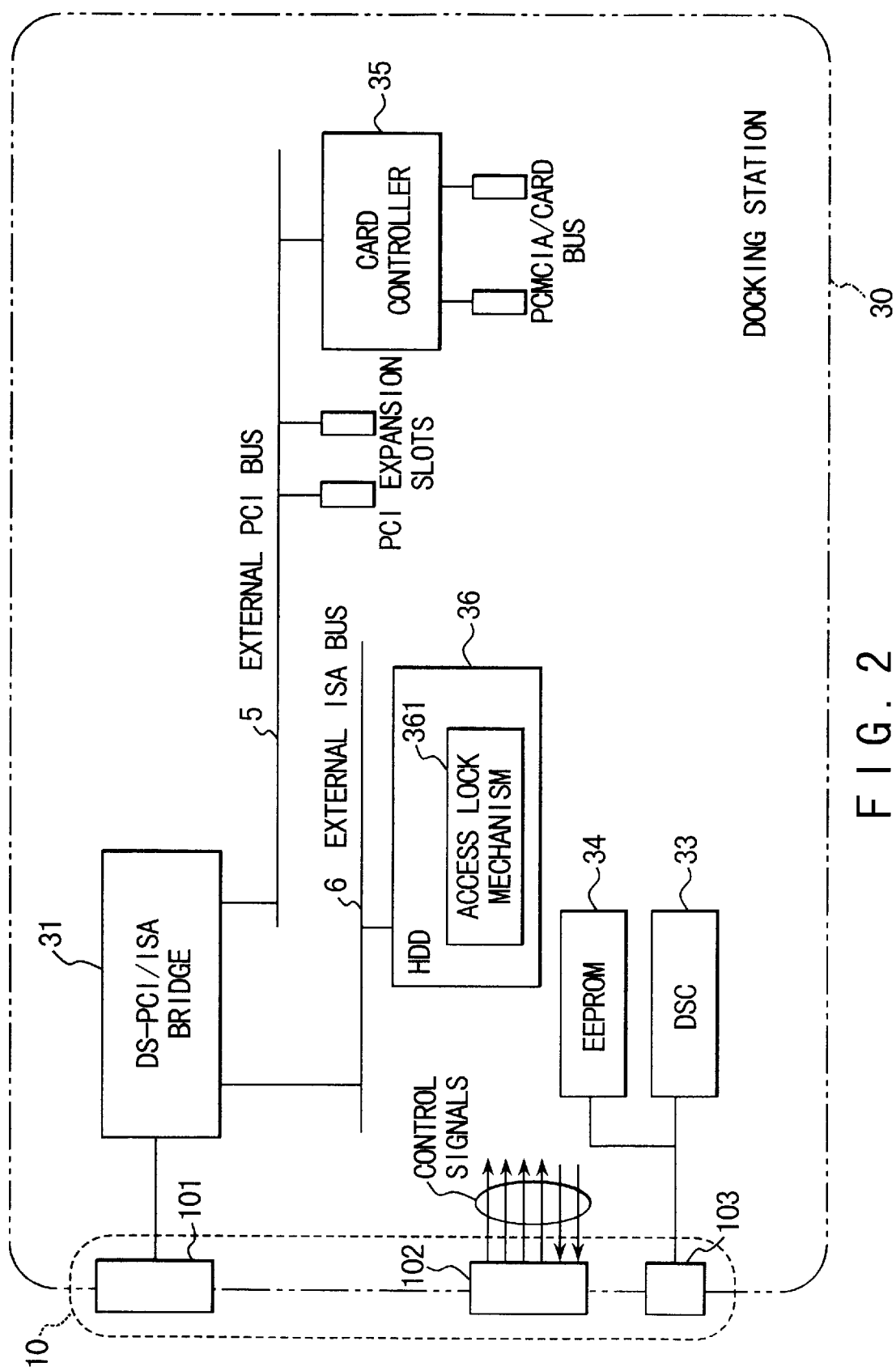
F I G. 2

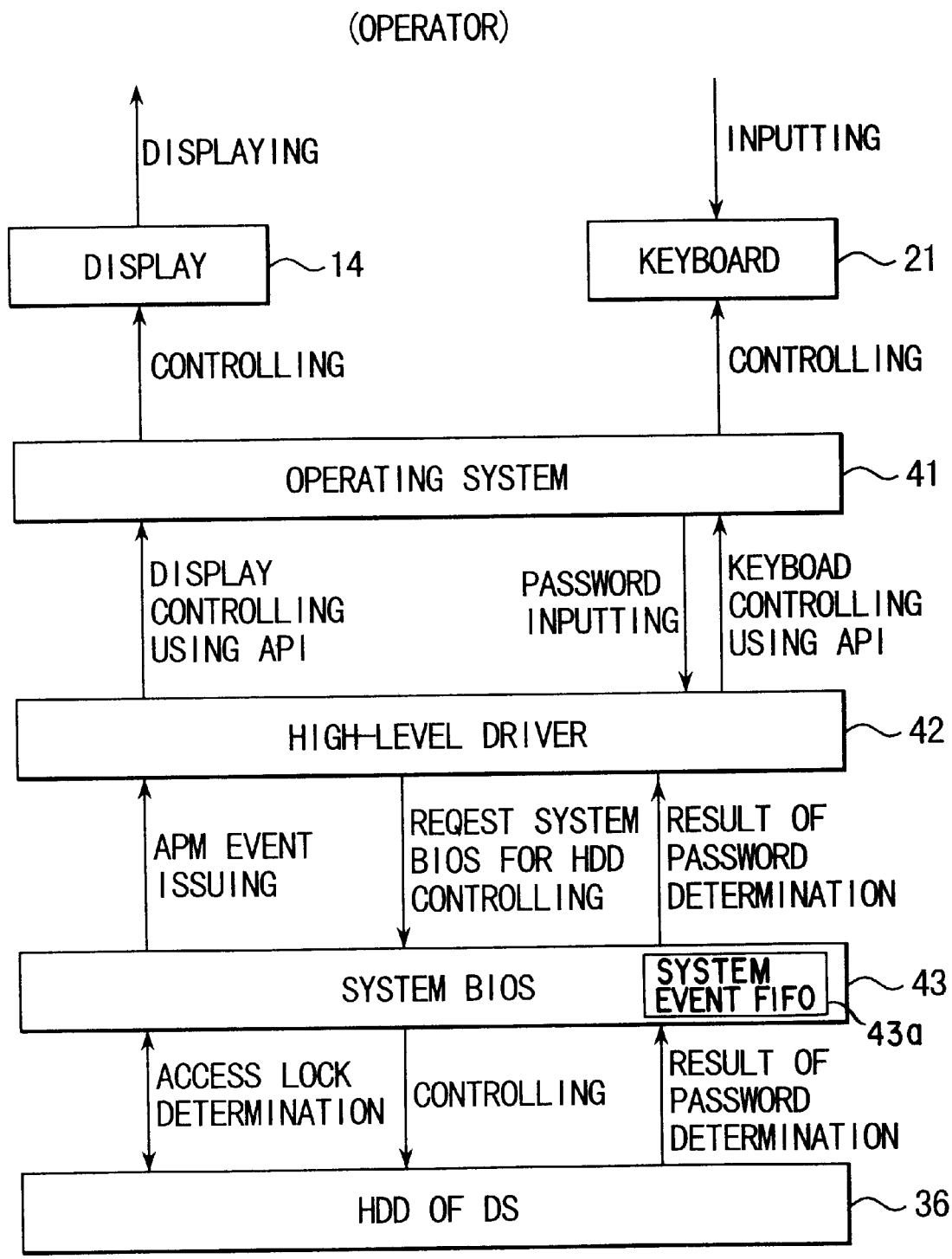
F I G. 4

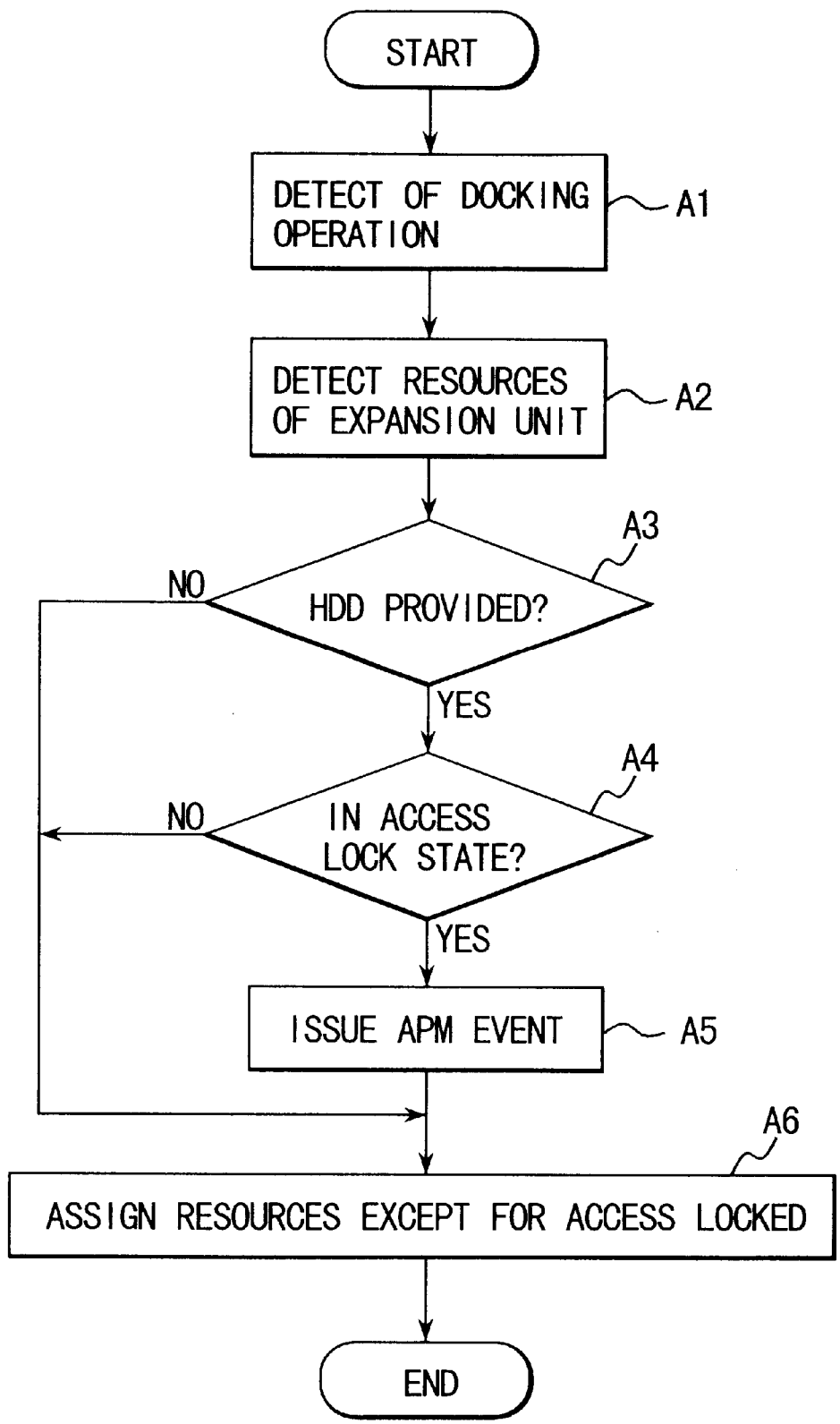
F I G. 5

COMPUTER SYSTEM HAVING EXPANSION UNIT

BACKGROUND OF THE INVENTION

The present invention relates to a computer system adaptable to a personal computer, such as a notebook type personal computer, and more particularly to a computer system having a computer body and an expansion unit on which the computer body is detachably mounted.

The entire contents of Japanese Patent Application No. 8-71396 filed on Mar. 2, 1996 are incorporated herein by reference.

In recent years, a variety of portable computers, such as lap-top type personal computers and notebook type personal computers, have been developed, which can easily be carried by a user and which can be operated by a battery therein. In order to extend the function of a portable computer of the foregoing type, the portable computer is structured to be mounted on an expansion unit, if necessary.

The expansion unit has a drive bay for accommodating drive units, such as a hard disk drive, and extension slots for receiving a variety of option cards. Therefore, when the portable computer is connected to the expansion unit and operated when a requirement has arisen, the function of the portable computer can easily be extended while maintaining the portability of the portable computer. Recently, a major portion of the portable computers is adaptable to so-called hot docking with which addition (and deletion) of devices is permitted in a state where the system is being operated. The portable computer has been enabled to be mounted on the expansion unit during the operation of the system.

In recent years, a storage unit, such as a hard disk drive, having an access lock function has been developed. The access lock function is a function with which a predetermined password is previously stored in the hard disk drive so as to be subjected to a comparison with a password input from a user of the system when the system is booted and which permits an access only when the two passwords coincide with each other. As a result, even if the hard disk drive has been illegally removed and then mounted on another computer, leakage of stored information can previously be prevented.

As described above, the portable computer (the computer body) is mounted on the expansion unit if necessary to extend the function. In order to perform hot docking, the device in the expansion unit is, as a resource, assigned to the system during the operation of the system. Therefore, if a hard disk drive having the access lock function is accommodated in the expansion unit, a screen for releasing the access lock must be displayed on the computer body during the operation of the system.

In general, the operating system in the computer body has been operated when hot docking is performed, the operating system controlling the display and the keyboard.

Latest operating systems employ an interface called "GUI (Graphical User Interface). The GUI is arranged to display pictures and icons on the screen to permit a user to intuitively and easily use the computer such that the user uses a pointing device, such as a mouse, to instruct a displayed icon to perform a required operation. Therefore, for example, the control of the display on the display unit has a considerably complicated structure. Thus, a system BIOS cannot easily control the display during the operation of the operating system. If the system BIOS arbitrarily makes an access to the hardware such as the display unit, unconformity takes place over the system. As a result, the operating system is probable to be adversely affected.

Hitherto, if the storage device accommodated in the expansion unit is in the access lock state when hot docking has been performed, the system BIOS cannot therefore display the screen for inputting a password. Thus, the system BIOS cannot perform a process for releasing the access lock. Even if the screen for inputting a password can be displayed, return to the screen immediately before the screen for inputting a password is sometimes inhibited. Although the expansion unit is an important factor for extending the function of the portable computer as described above, the conventional structure cannot release the access lock of the storage device accommodated in the expansion unit when hot docking is performed. As a result, the storage device cannot be added as a resource for the portable computer.

BRIEF SUMMARY OF THE INVENTION

An object of the present invention is to provide a computer system enabling access lock of a storage device to be released when a portable computer and an expansion unit are hotly docked and thus permitting the storage device to be added as a resource.

According to one aspect of the present invention, there is provided a computer system arranged to display all of screens through an operating system after the operating system has been turned on, the computer system comprising: a computer body; and an expansion unit to be detachably attached to the computer body in order to extend the function of the computer body, wherein the expansion unit has a storage device accommodated in the expansion unit, the storage device having an access lock function for subjecting a supplied password and a predetermined password stored inside to a comparison and permitting an access to the storage device when the passwords coincide with each other, wherein the computer body has a password input driver for, through the operating system, displaying a screen for inputting the password to be output to the storage device; docking detection portion for detecting that the computer body is attached to the expansion unit during operation of the system; resource detection portion for detecting a variety of resources including the storage device accommodated in the expansion unit; determination portion for determining whether or not the detected resource is a storage device which has been brought to an access lock state by the access lock function; first resource assigning portion for assigning, to the system, the resource determined by the determination portion not to be the storage device which has been brought to the access lock state; password input portion for instructing the password input driver to perform a process for inputting the password to be given to the resource determined by the determination portion to be the storage device which has been brought to the access lock state; portion for attempting releasing the access lock by supplying the password output from the password input driver to the storage device which has been brought to the access lock state to attempt releasing of the access lock; and second resource assigning portion for assigning the storage device to the system when success of releasing the access lock has been notified from the storage device.

According to a second aspect of the present invention, there is provided a method of assigning resources, used in a computer system arranged to display all of screens through an operating system after the operating system has been turned on, and having a computer body which has a password input driver for, through the operating system, displaying a screen for inputting the password and an expansion unit to be detachably attached to the computer body in order to extend the function of the computer body, the expansion unit having a storage device which has an access lock function for subjecting a supplied password and a predetermined password stored inside to a comparison and permitting an access to the storage device when the passwords coincide with each other, the method comprising the steps of: detecting that the computer body is attached to the expansion unit during operation of the system; detecting a variety of resources including the storage device accommodated in the expansion unit; determining whether or not the detected resource is a storage device which has been brought to an access lock state by the access lock function; assigning, to the system, the resource determined by the determination portion not to be the storage device which has been brought to the access lock state; instructing the password input driver to perform a process for inputting the password to be given to the resource determined by the determination step to be the storage device which has been brought to the access lock state; attempting releasing the access lock by supplying the password output from the password input driver to the storage device which has been brought to the access lock state to attempt releasing of the access lock; and assigning the storage device to the system when success of releasing the access lock has been notified from the storage device.

According to a third aspect of the present invention, there is provided a computer system comprising: a computer body; and an expansion unit to be detachably attached to the computer body, which includes storage device having an access lock function for subjecting a supplied password and a predetermined password stored inside to a comparison and permitting an access to the storage device when the passwords coincide with each other, wherein the computer body has a display device; a keyboard; an operating system for controlling data to be displayed on the display device, for receiving the password input by an operator through the keyboard and for outputting the received password; a system basic input output system (BIOS) for determining whether or not the storage device is in a access locked state, for issuing a predetermined event when the storage device is in a locked state, for supplying the password input by the operator to the storage device, and for receiving a result of the passwords comparison; and a driver for controlling the operating system so that the display device displays a message for requesting password input to the operator in response to the issuing of the predetermined event, supplying the password output by the operating system to the system BIOS, for receiving the result of the passwords comparison from the system BIOS and for controlling the operating system so that the display device displays the result of the passwords comparison.

According to the present invention, when the computer body has been connected to an expansion unit, the docking detection portion detects the connection. The resource detection portion detects resources stored in the expansion unit. The determination portion determines whether or not each resource is a storage device, the access to which has been locked.

At this time, the first resource assigning portion initially assigns, to the system, a resource which has been determined that it is not a storage device, the access to which has been locked. On the other hand, the password input portion instructs the password input driver to input a password which is given to the storage device, access to which has been locked.

The password input driver uses API (Application Program Interface) or the like to display a screen on which the password is input. As a result, an access to the display is made through a standard interface provided on the operating system so that an operating system, which is being operated, is not adversely affected.

The input password obtained by the password input driver and supplied from a user is, through the releasing attempt portion, supplied to the storage device, access to which has been locked, so that releasing of the access is attempted.

It is preferable that the releasing attempt portion be included in the system BIOS and arranged to convert the input password in accordance with a predetermined rule before the releasing attempt portion supplies the input password to the storage device. As a result, leakage of the password by analyzing the password input driver and publication of the access releasing procedure can be prevented.

When success of the attempted releasing of the access has been notified from the storage device, the second resource assignment portion also assigns the storage device to the system.

As a result, the access lock of a storage device in the expansion unit can be released when a portable computer and an expansion unit are hotly docked and thus the storage device can be added as a resource.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 2 is a block diagram showing the structure of a docking station capable of mounting the computer body shown in FIG. 1 thereon;

FIG. 4 is a diagram showing the relationship among elements relating to the process for releasing the access lock according to this embodiment;

FIG. 5 is a flow chart of a process which is performed when the computer body and the docking station according to this embodiment are hotly docked to each other;

DETAILED DESCRIPTION OF THE INVENTION

An embodiment of the present invention will now be described with reference to the drawings.

Figure 1:
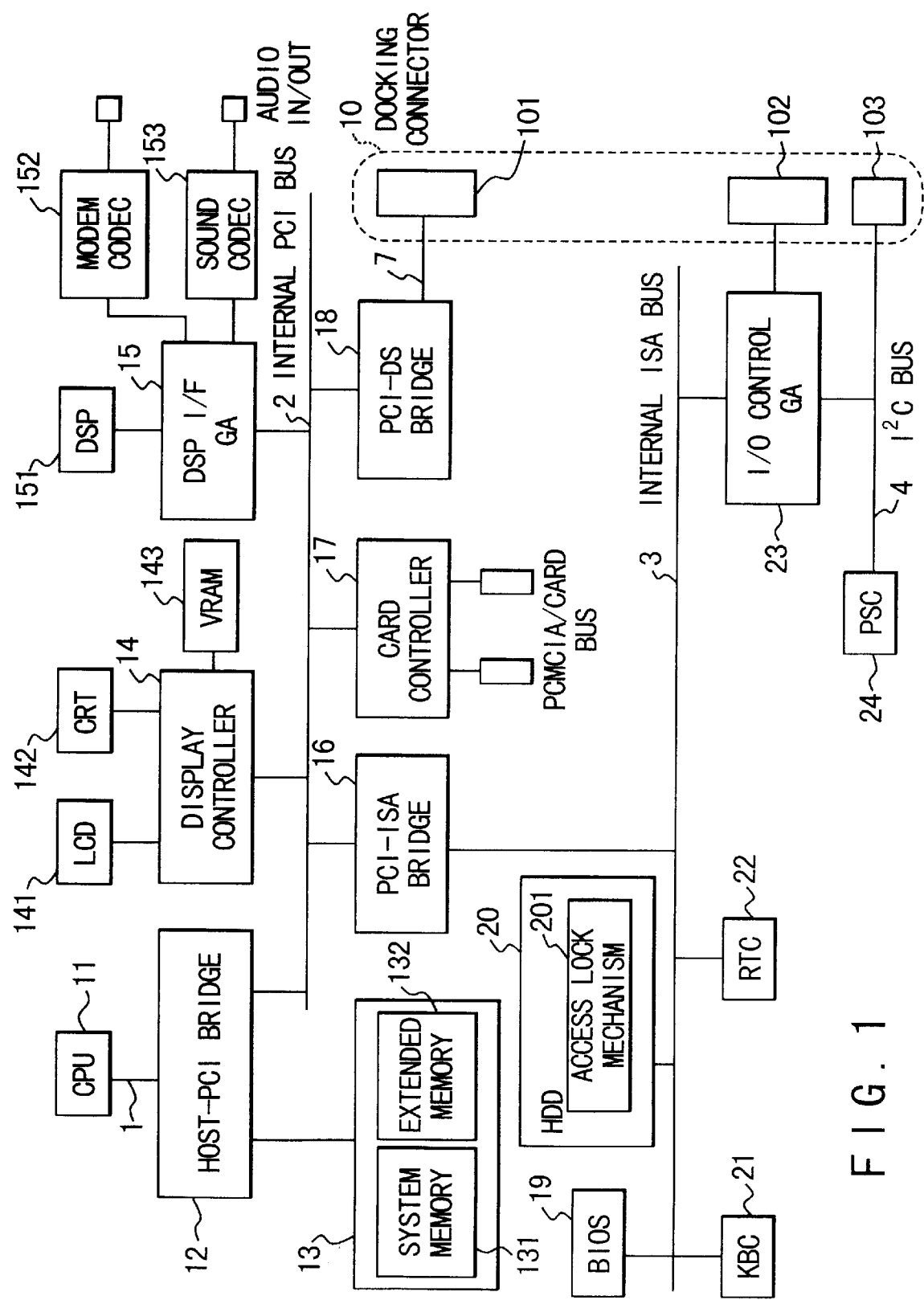
FIG. 1 is a block diagram showing the structure of a computer body in a computer system according to an embodiment of the present invention.

FIG. 1 is a diagram showing the structure of a computer system according to the embodiment of the present invention. The computer system according to this embodiment is a notebook type or a lap-top type portable computer which can be operated by a battery. A system board of the computer system according to this embodiment has a processor bus 1, an internal PCI bus 2 (PCI: Peripheral Component Interconnect), an internal ISA bus 3 (ISA: Industry Standard Architecture) and an I²C bus 4. Moreover, the body of the portable computer has a docking connector 10 to which a docking station 30 shown in FIG. 2 is, as an expansion unit for extending the function, connected by a user, if necessary. As shown in FIG. 1, the docking connector 10 is composed of three connector elements 101, 102 and 103.

The computer body includes a CPU (Central Processing Unit) 11, a host-PCI bridge unit 12, a memory 13, a display controller 14, a DSP interface gate array (DSP I/F GA, DSP: Digital Signal Processing) 15, an internal PCI-ISA bridge unit 16, a card controller 17, a PCI-DS (DS: Docking Station) bridge unit 18, a BIOS ROM 19 (BIOS: Basic Input Output System, ROM: Read-Only Memory), a hard disk drive 20, a keyboard controller 21, a real time clock (RTC) 22, an I/O control gate array 23, a power-source controller (PSC) 24 and so forth.

The docking station 30 is provided to extend extension devices, such as a PCI extension card, an ISA extension card, a PC card, the hard disk drive and a CD-ROM (Compact Disk Read-Only Memory) drive. As shown in FIG. 2, the docking station 30 includes an external PCI bus 5 and an external ISA bus 6 to serve as extension buses to which a drive bay, a PCI extension slot, an ISA extension slot and so forth are connected. A hard disk drive 36 is connected to the external ISA bus 6, the hard disk drive 36 being assumed in this description, to be in an access lock state (that is, no access is permitted until a correct password is supplied) by an access lock mechanism 361. The structure for releasing the access lock of the hard disk drive 36 is a characteristic of the present invention to be described later.

Moreover, the docking station 30 includes a DS-PCI/ISA bridge unit 31, a DS controller 33 and an EEPROM (Electrically Erasable and Programmable ROM) 34.

The functions and structures of the components provided for the computer body shown in FIG. 1 will now be described.

The CPU 11 is realized by, for example, a microprocessor called "Pentium" manufactured and marketed by Intel, U.S. The processor bus 1 directly connected to an input/output pin of the CPU 11 has a data bus having a width of 64 bits.

The memory 13 is a memory device for storing device drivers, application programs which are arranged to be executed, processed data and so forth, the memory 13 being composed of a plurality of DRAM modules. As one of the device drivers, a password input driver (a high-order driver), which is a characteristic of the present invention, is stored. The high-order driver displays a screen for urging a user to input a password to be supplied to the access lock mechanism 361 by using API (Application Program Interface), the screen being displayed by the interface of the operating system.

The memory 13 is composed of a system memory 131 which is previously mounted on the system board and an extension memory 132 which is mounted by a user when required. As the DRAM modules for structuring the system memory 131 and the extension memory 132, high-speed memories, such as synchronous DRAM or Rambus, which require supply of memory clocks for each bank thereof.

The memory 13 is, through an exclusive memory bus having a data bus, the width of which is 32 bits or 64 bits, connected to the host-PCI bridge unit 12. As the data bus for the memory bus, the data bus for the processor bus 1 may be used. In this case, the memory bus is composed of an address bus and a variety of memory control signal lines.

The host-PCI bridge unit 12 is a bridge LSI for connecting the processor bus 1 and the internal PCI bus 2 to each other, the host-PCI bridge unit 12 being arranged to act as one of bus masters of the PCI bus 2. The host-PCI bridge unit 12 has a function for, in a bi-direction manner, converting bus cycles including data and addresses between the processor bus 1 and the internal PCI bus 2; and a function for controlling an access to the memory 13.

The internal PCI bus 2 is a clock synchronous type input/output bus arranged such that all of cycles on the internal PCI bus 2 are performed in synchronization with PCI bus clocks. The frequency of the PCI bus clock is, for example, 33 MHz or lower. The internal PCI bus 2 has an address/data bus which is used in a time division manner. The address/data bus has a width of 32 bits.

The data transfer cycle on the internal PCI bus 2 is composed of address phases and one or more data phases following the address phases. In the address phase, the address and the type of transference are output, while 8-bit, 16-bit, 24-bit or 32-bit data is output in the data phase.

The display controller 14 is, similarly to the host-PCI bridge unit 12, one of the bus masters of the internal PCI bus 2 arranged to display image data stored in a video memory (VRAM) 143 on an LCD (Liquid Crystal Display) 141 or an external CRT (Cathode Ray Tube) display unit 142.

The DSP interface gate array 15 is one of PCI devices, the DSP interface gate array 15 being arranged to form a DSP system for performing a variety of sound processes and telephone/data communication process in cooperation with a DSP 151, a modem (CODEC) 152 and a sound CODEC 153. The DSP interface gate array 15 is, under control of an exclusive device driver program which is read by the memory 13 so as to be executed, arranged to hold a communication with the DSP 151, the modem (CODEC) 152 and the sound CODEC 153 to control the sound process and communication process using a digital signal processing function of the DSP 151.

The internal PCI-ISA bridge unit 16 is a bridge LSI for connecting the internal PCI bus 2 and the internal ISA bus 3 to each other and arranged to act as one of the PCI devices. The internal PCI-ISA bridge unit 16 includes a PCI bus arbiter and a DMA controller. The BIOS ROM 19, the HDD 20, the keyboard 21, the RTC 22 and the I/O control gate array 23 are connected to the internal ISA bus 3.

The card controller 17 is one of the PCI devices and arranged to control a PC card having PCMCIA (Personal Computer Memory Card International Association) specification or a card bus specification.

The PCI-DS bridge unit 18 controls connection and disconnection of the bus to and from the docking station 30. That is, the PCI-DS bridge unit 18 is a bridge LSI for connecting the internal PCI bus 2 and a docking bus 7 which equivalents to the PCI bus, the PCI-DS bridge unit 18 being arranged to act as one of the PCI devices. The docking bus 7 is drawn out through the connector element 101 of the docking connector 10 so as to be connected to the docking station 30.

The BIOS ROM 19 stores system BIOS (Basic Input Output System). The BIOS ROM 19 is formed by a flash memory so as to rewrite the program. The system BIOS includes an IRT (Initialization and Reliability Test) routine which is executed at the time of system boot; device drivers for controlling various I/O devices; a system management program and; a set-up routine.

The system management program is an interruption program which is executed in a SMM (System Management Mode) and which includes various SMI service routines, such as a SMI handler (SMI: System Management Interrupt) and a hot key processing routine. The SMI handler turns on the SMI service routine to correspond to the cause of generation of the SMI. When a SMI has been generated with a hot key, the SMI handler turns on a hot key processing routine. If an SMI is generated due to another factor, the SMI handler turns on a SMI service routine corresponding to the factor.

The set-up routine corresponds to a key input operation performed by a user to change setting of the operation environment of the system.

The I/O control gate array 23 is a bridge LSI for connecting the internal ISA bus 3 and the I$^2$C bus 4 to each other, the I/O control gate array 23 including a plurality of register groups which can be read/written by the CPU 11. By using the register groups, communication between the CPU 11 and the power-source controller 24 on the I$^2$C bus 4 can be held.

A plurality of control signal lines which are connected to the docking station 30 are drawn out from the I/O control gate array 23 through the connector element 102 of the docking connector 10. The I/O control gate array 23 detects docking/undocking between the computer body and the docking station 30. Moreover, when the docking station 30 is connected in a state where the power supply is being performed to the computer body, the I/O control gate array 23 performs control in order to prevent breakage of the expansion unit in the docking station 30 and malfunction of the system attributable to hot swap or the like.

The I$^2$C bus 4 is a bi-directional bus formed by one clock signal line and one data line (SDA), the I$^2$C bus 4 being drawn out through the connector element 103 of the docking connector 10.

The power-source controller 24 is arranged to turn on/off the power supply to the computer body when the power supply switch has been switched on/off. Moreover, the power-source controller 24 controls the power source to correspond to whether or not docking with the docking station 30 is performed.

Components of the docking station 30 shown in FIG. 2 will now be described.

Figure 3:
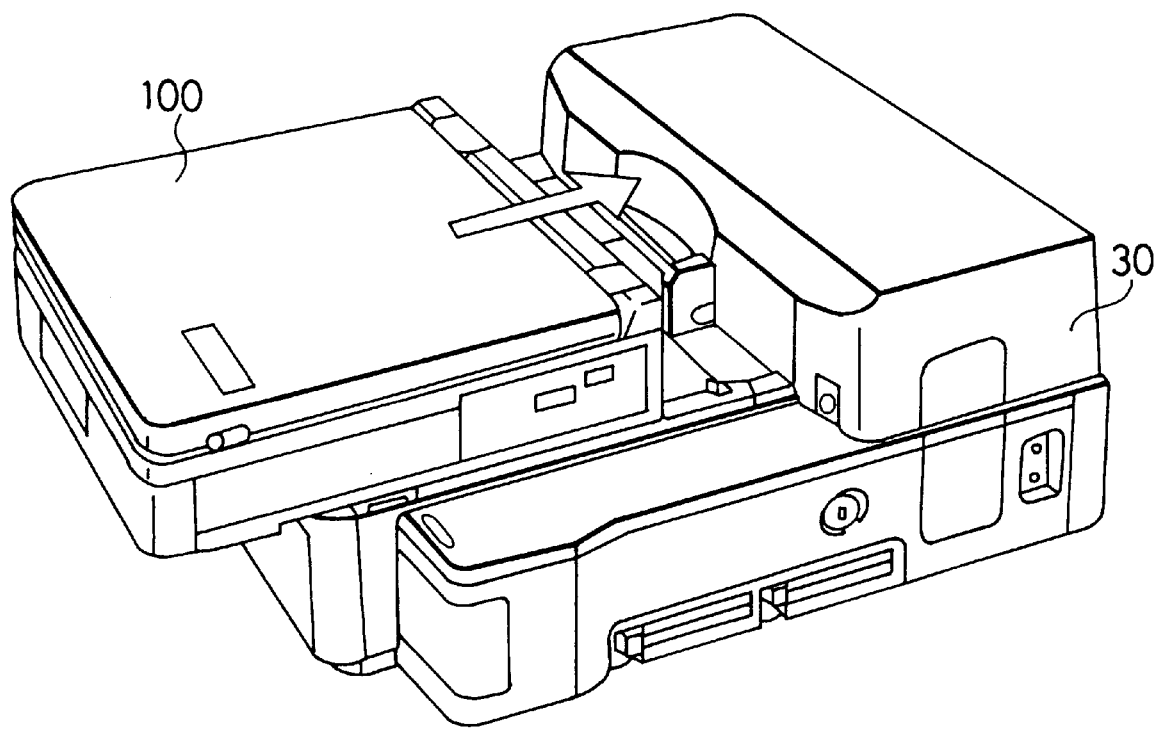
FIG. 3 is a perspective view showing a state where the computer body shown in FIG. 1 is mounted on the docking station shown in FIG. 2.

As described above, the docking station 30 is an expansion unit which can be detachably mounted on the portable computer body. FIG. 3 is a diagram showing a state where the computer body is mounted on the docking station 30.

The DS-PCI/ISA bridge unit 31 disposed in the docking station 30 having the above-mentioned shape is a bridge LSI for connecting the docking bus 7 drawn out from the computer body to the docking station 30, the external PCI bus 5 and the external ISA bus 6. The DS-PCI/ISA bridge unit 31 is one of the PCI devices.

The DS controller 33 is a microcomputer for controlling to turn on/off the power supply for the docking station 30 and docking/undocking between the computer body and the docking station 30. The DS controller 33 holds communication with the power-source controller 24 and the I/O control gate array 23 of the computer body through the I$^2$C bus 4.

The EEPROM 34 stores PnP information required for performing plug and play (PnP), information above being attributes (address, DMA channel, IRQ number and so forth) of an extension card inserted into the extension slot in the docking station 30. PnP information above is, under control of the system BIOS of the BIOS ROM 19, read from the EEPROM 34 by the I/O control gate array 23 through the I$^2$C bus 4 when the computer body and the docking station 30 have been docked together or power supply to the computer body or the docking station 30 has been turned on.

The card controller 35 controls a PC card conforming to the PCMCIA/card bus specification, similarly to the card controller 17 in the computer body.

Then, elements and various operations relating to a process for releasing the access lock of the hard disk drive 36 will now be described with reference to the drawings.

FIG. 4 is a diagram showing the system according to this embodiment. As shown in FIG. 4, this embodiment has a structure such that when the access lock of the hard disk drive 36 of the docking station 30 is released in a state where the system of the computer body is being operated (in a state where hot docking is performed), control of the hard disk drive 36 is performed by a system BIOS 43. However, control of the display unit 14 and the keyboard 21 with which a user inputs a password or the like is performed by a high-order driver 42 using the API. Thus, the control is performed under control of the operating system 41 so that unconformity of the overall system is prevented. Moreover, the operating system is free from an adverse influence. The system BIOS includes a system event FIFO (first-in, first-out) which stores system events including APM events or the like.

The high-order driver 42 and the system BIOS 43 will now be described.

For example, HDDPWP. Drv may be applied to the high-order driver.

API function for use to display a screen and perform key input and adaptable to WINDOWS employs a usual dialog box process. When one dialog box object has been declared, a predetermined member function is called.

The high-order driver 42 processes a special message of Window 95 called WM POWERBROADCAST to receive an APM event from the system BIOS 43.

Functions relating to the system BIOS 43 and provided for the computer system according to this embodiment will be described below.

In this embodiment, HCI (Hardware Configuration Interface) function is newly provided. The HCI function is used to read a hardware configuration through the DOS application or windows application, or to set a hardware configuration through the same.

The functions of the system BIOS includes:

(1) Reading of a system event (determining an event among system events that has been generated);
(2) Control of a system event function (inhibition and permission of the system event function). However, default setting is set to inhibition, the high-order driver permits the system event; and
(3) Verification of a password for a HDD (deletion of the password for the HDD).

The APM events include a plurality of extension events as the OEM extension events which are assigned codes 0200h to 02FFH.

A system event (02FFh) of the OEM extension events is newly provided in the computer system.

Furthermore, a password request event (0001h) for the HDD is newly provided in the computer system as one of the system events.

The foregoing functions (1) to (3) will now be described further in detail.

(1) The function for reading the system event is arranged to read the system event from the system event FIFO. After reading has been performed by the above-mentioned function, the system event is cleared by updating a reading pointer. If the system event function is invalid, error code (80h) is returned.

As to the function for reading the system event, the specifications of input/output registers provided in the CPU 11 are as shown below.

INPUT REGISTER
AH=44h
AL=FEH
BX=0016h . . . system event
OUTPUT REGISTER
Normal Termination
AH=00h
CX=system event
CF=0
Error Occurrence
AH=80h . . . sub-function error or unsupported function of the system
8Ch . . . the system event FIFO becomes empty.
CF=1

(2) The function for controlling the system event function sets whether the system event function is valid or invalid. Setting is performed by setting flags provided in a SM-RAM.
FLAGS OF SM-RAM
Bit 0 . . . valid of the system event function (1)/invalid (0: default value)
Other bits . . . reservation (0)

As to the function for setting valid/invalid of the system event function, the specifications of the input/output registers are as shown below.
INPUT REGISTER
AH=44h
AL=FFh
BX=0016h . . . system event
CX=0000h: invalid
0001h: valid
OUTPUT REGISTER
Normal Termination
AH=00h
CF=0
Error Occurrence
AH=80h sub-function error or unsupported function of the system
CF=1

(3) The function for verifying the password for the HDD is arranged to verify the password for the HDD in the docking station.

When this verifying function has been performed, the access lock of the HDD connected to the docking station is attempted to be released. When the verifying function is activated by the HCI, the EHCI is activated again and the function is executed. In the state where the access to the HDD in the docking station is locked, locking of the access is released. If the access is not locked, or if no HDD exists, 80h error is returned.

Releasing of the access lock is performed by temporarily making valid the resource. If access lock is released successfully, a corresponding PnP node is included and the success of releasing is notified to the OS by a System Device Changed (a PnP event). If releasing of the access lock was unsuccessful, the resource is made invalid and 83h error is returned.

When a number of characters of the password is less than 10 characters, "00h" is added to trailing of a final code. For example, when the password is "1234", EDX=02030405h, and ESI=00xxxxxxh is input ("x" is an arbitrary hexadecimal digit.

As to the verifying function, the specifications of the input/output registers are as shown below.
INPUT REGISTER
AH=44h
AL=FEh
BX=0017h . . . verifying HDD password
CX=0000h: user's password
0001h: master password
EDX=the first to fourth characters of the password (scan codes)
ESI=the fifth to eighth characters of the password (scan codes)
DI=the ninth to tenth characters of the password (scan codes)
OUTPUT REGISTER
Normal Termination
AH=00h
CF=0
Error Occurrence
AH=80h . . . sub-function error or unsupported function of the system
83h . . . data input error
CF=1

The newly provided events will now be described further in detail.

Event codes 0200H to 02FFH can be used in the OEM extension events. The OEM extension events in this embodiment include the two evens below:

1. User System Shutdown Request
Notification . . . 020AH

When the automatic shutdown mechanism has been enabled in a state where the system is being operated in a boot mode and SMI is generated by the power switch, foregoing event is issued. The operation, which is performed after the event has been issued, is similar to the operation which is performed when a suspend request notification has been issued. Supervisory of time out for 20 seconds is performed. If the time has lapsed, a process for forcibly turning off the power source is performed. When the high-order driver has received the foregoing event, it performs an automatic shutdown process and instructs to perform a power off process with 5307H/Set Power State function.

SHUTDOWN SEQUENCE
CAUSE . . . turning power off in a boot mode or panel closing
APM→POWER . . . notification of user's shutdown request
POWER→APM . . .
Case 1) analyzing
Case 2) off request
Case 3) deny
Case 4) time out APM BIOS (corresponding to the four cases) . . .
1) output a command for time out extension to the PS (power supply)
2) turn off the system
3) output a command for canceling power off to the PS
4) turn off the system 2. System Event Notification . . . 02FFh When a system event has been generated and thus the system event FIFO is not empty, the foregoing event is issued. Note that the event above has the lowest priority among events which will be issued.

As the system event, "HDD Password Requirement Event (0001h)" is provided.

When the access to the HDD in the docking station is locked after hot docking has been performed, this event is stored in the system event FIFO. If the system event FIFO is full or the system event function is invalid, the event code is not stored.

Referring to FIG. 5, the process which is performed when the computer body is hotly docked to the docking station 30 will now be described. This process is performed by the system BIOS 43.

When hot docking has been performed, docking is detected by the I/O control gate array 23 and is notified to the system BIOS 43 (step A1). The system BIOS, which has received the notification above, detects a device, which is accommodated in the docking station 30 and which must be assigned to the system as a resource (step A2).

When the system BIOS has detected the hard disk drive 36 (YES in step A3), the system BIOS determines whether or not the hard disk drive 36 is in an access lock state by the access lock mechanism 361 (step A4). If a result of the determination is the access lock state (YES in step A4), the system BIOS issues a predetermined APM (Advanced Power Management) event as an access lock event which indicates the access lock state (step A5). specifying the interface between the system BIOS and the operating system relating to control of the power source. For example, APM is a rule to instruct the OS to cause, for example, the application to perform a process, the APM being an interface which is accepted by the OS. In this embodiment, the predetermined APM event (access lock event) is issued so that the access lock state is notified.

The system BIOS assigns the device except the hard disk drive 36, which is in the access lock state, to the system (step A6).

Figure 6:
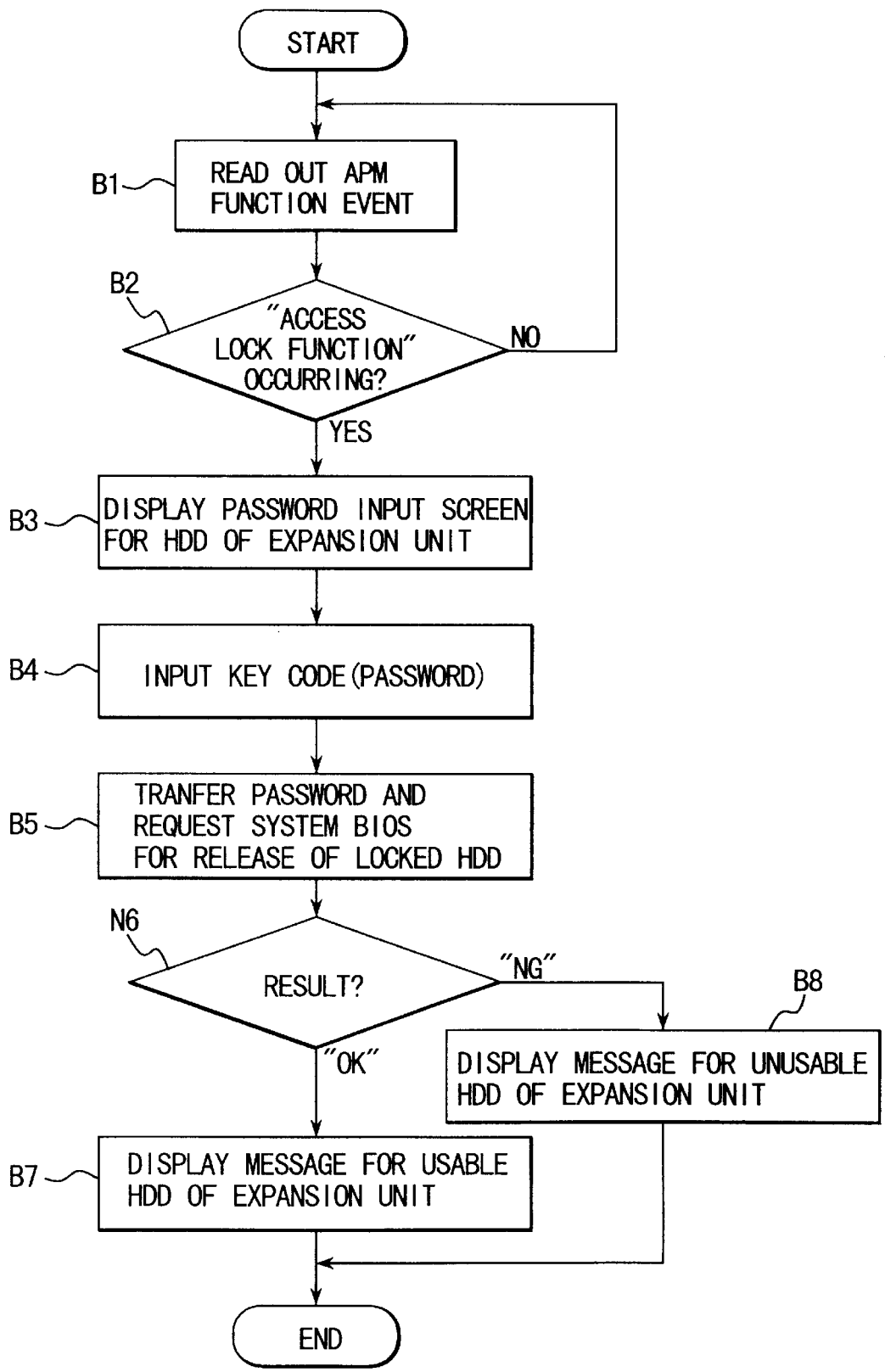
FIG. 6 is a flow chart of a process which is performed when an APM event is issued in this embodiment.

FIG. 6 is a flow chart of a process which is performed attributable to the issue of the APM event. This process is mainly performed by the high-order driver.

The high-order driver for displaying the screen for inputting the password under the control of the operating system supervises generation of the APM event at predetermined intervals through a POWER driver (step B1). If an APM event is generated, the high-order driver determines whether or not the generated APM event is the predetermined APM event (access lock event) indicating the access lock state (step B2).

Step B1 above is performed by processing a special message which is WM POWERBROADCAST.

The determination in step B2 is performed such that a determination whether or not the APM event, in step B1, read from message information is an OEM extension event (0200h to 02FFh) is performed. If the read APM event is the OEM extension event, whether or not the OEM extension event is a system event (02FFh) is determined. If the OEM extension event is the system event, the BIOS function reads the system event. In this step, whether or not the system event is an access lock function event (password request event for HDD) is determined.

If the system event is the event indicating the access lock state (the access lock function event), the high-order driver uses the API to display a screen for inputting a password set for the hard disk drive 36 (step B3). Since the foregoing display is performed by the API, the control of the display is controlled through the operating system. Thus, the operating system is free from an adverse influence.

When the high-order driver has received the password supplied from the user through the keyboard 21 and the OS 41, the high-order driver supplies the password to the system BIOS to request to release the access lock of the hard disk drive 36 (steps B4 and B5).

Figure 7:
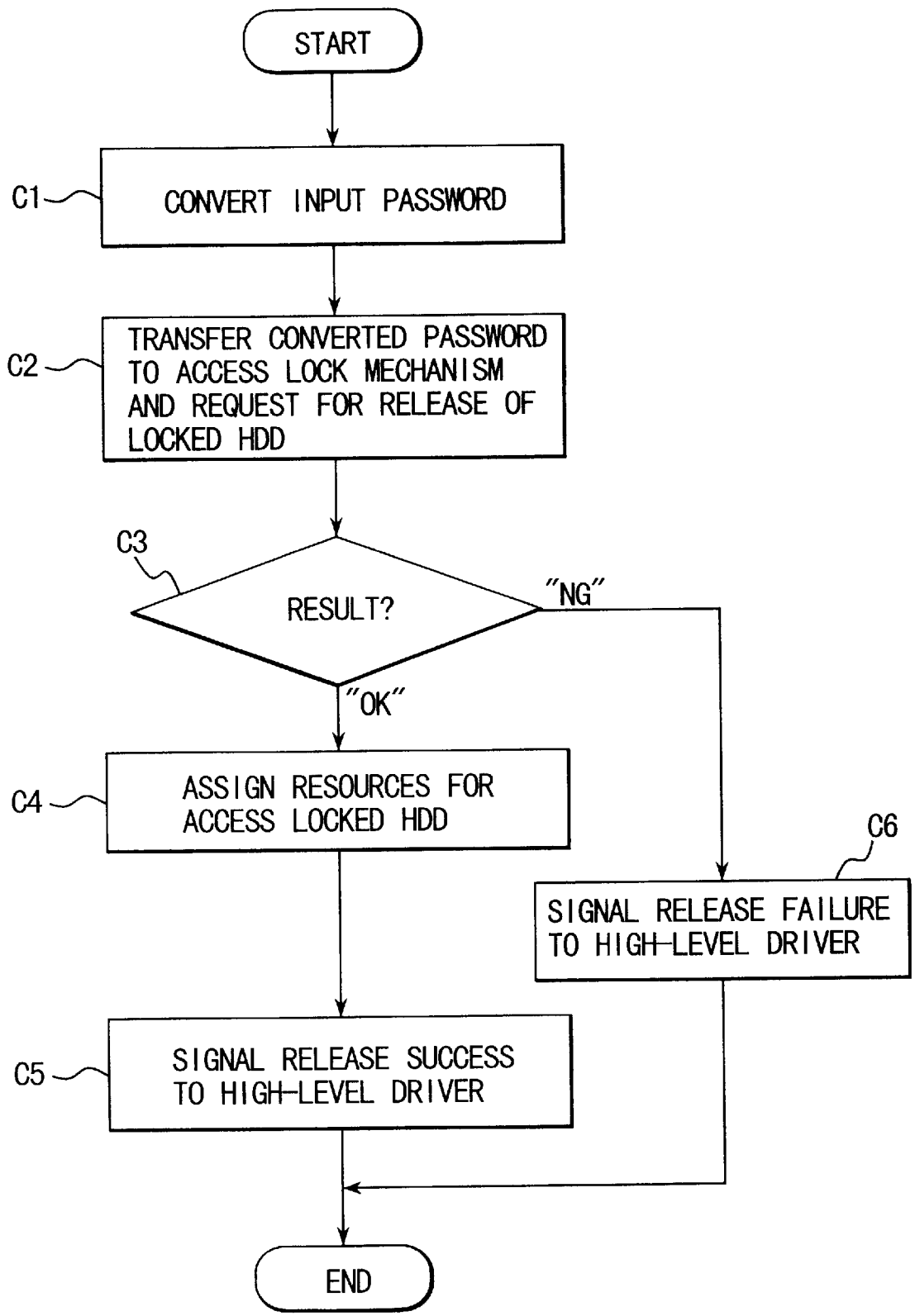
FIG. 7 is a flow chart of a process which is performed when access lock of a hard disk drive of the docking station according to this embodiment is released.

FIG. 7 is a flow chart showing the process for releasing the access lock of the hard disk drive 36. The process shown in FIG. 7 corresponds to the function for verifying the password for the HDD.

The system BIOS converts the password supplied from the high-order driver in accordance with a predetermined rule (step C1), and then supplies the converted password to the access lock mechanism 361 of the hard disk drive 36 to request releasing of the access lock (step C2).

The access lock mechanism 361 of the hard disk drive 36, which has received the input password, compares the supplied password and a predetermined password to each other. If the two passwords coincide with each other, success in releasing of the access lock is replied to the system BIOS. If the two passwords do not coincide with each other, failure of releasing of the access lock is replied to the system BIOS.

When the system BIOS has received a notification of success of releasing of the access lock ("OK" in step C3), the system BIOS assigns the hard disk drive 36, the access lock to which has been released, to the system as a resource (step C4), and then notifies the high-order driver the success of releasing of the access lock (step C5). If the system BIOS has received failure of releasing of the access lock ("NG" in step C3), the system BIOS notifies the high-order driver the failure of releasing of the access lock (step C5).

After releasing of the access lock has been attempted by the above-mentioned procedure, the high-order driver displays a message indicating the result of the attempt by using the API. That is, if the high-order driver has received a notification of the success of releasing of the access lock from the system BIOS ("OK" in step B6), the high-order driver display a message indicating a fact that the hard disk drive 36 has been brought to a usable state (step B7). If the high-order driver has received the notification of the failure of releasing of the access lock ("NG" in step B6), the high-order driver displays a message indicating that the hard disk drive 36 cannot be used (step B8).

The foregoing operations in steps B5 to B8 are dialog box processing and are executed by reading out a dialog box object.

As described above, according to the present invention, a process for requiring the user to input a password for releasing the access lock can be performed through the operating system. Therefore, access lock of a device accommodated in the expansion unit can be released without an adverse influence on the system when the computer body and the expansion unit have been hotly docked.

Since the foregoing process for releasing the access lock is performed by the BIOS, for example, unintentional publication of the procedure for releasing the access lock by analyzing the high-order driver can be prevented.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

I claim:

1. A computer system comprising:

a computer; and an expansion unit to which the computer is detachably attached in order to expand a function of the computer, wherein said expansion unit comprises a hard disk drive, said hard disk drive having an access lock function for inhibiting an access to said hard disk drive when an input password does not coincide with a predetermined password, and said computer comprises:

resource detection means for detecting a resource housed in said expansion unit when attachment of the computer to the expansion unit is detected, the resource including said hard disk drive;

determination means for determining whether or not said detected resource is a hard disk drive which is in an access inhibit state;

memory means, coupled to the determination means, for storing an event indicating that the hard disk drive is in an access inhibit state, and for issuing the event indicating that the hard disk drive is in an access inhibit state;

password input means for, through an operating system, displaying a guidance for prompting to input a password in response to issuance of the event indicating that the hard disk drive is in an access inhibit state from said memory means;

means for attempting releasing the access inhibit state of the hard disk drive by making the hard disk drive which is in the access inhibit state valid and by supplying the password input from said password input means to the hard disk drive which is made valid; and resource assigning means for assigning the hard disk drive to the operating system when the access inhibit state of the hard disk drive is released.

2. A computer system according to claim 1, in which said computer further comprises second resource assigning means for assigning, to the operating system, a resource other than the hard disk drive which is in an access inhibit state irrespective of input of password.

3. A computer system according to claim 1, in which said computer further comprises means for comparing the input password and the predetermined password and means for causing said resource assigning means assign the hard disk drive to the operating system when the input password and the predetermined password coincide with each other.

4. A computer system according to claim 1, in which said memory means issues a predetermined APM (Advanced Power Management) event indicating that the hard disk drive is in an access inhibit state.

5. A computer system according to claim 4, in which said attempting means comprises means for detecting that the hard disk drive is in an access inhibit state based on the kind of the APM event and means for causing said password input means to display the guidance when it is detected that the hard disk drive is in an access inhibit state.

6. A computer system according to claim 1, in which said resource assigning means informs the operating system of success of releasing the access lock by issuing a PnP (plug and play) event using a System Device Changed.

7. A computer system according to claim 1, in which said attempting means comprises means for converting the input password in accordance with a predetermined rule.

8. A computer according to claim 7, in which said converting means adds predetermined bits if the number of bits of the input password is less than a predetermined number.

* * * * *